(12) United States Patent
Dötschel

(10) Patent No.: US 12,480,577 B2
(45) Date of Patent: Nov. 25, 2025

(54) COUPLING ELEMENT AND GEARING WITH COUPLING ELEMENT

(71) Applicant: ZF Friedrichshafen AG, Friedrichshafen (DE)

(72) Inventor: Philip Dötschel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/967,250

(22) Filed: Dec. 3, 2024

(65) Prior Publication Data

US 2025/0180112 A1   Jun. 5, 2025

(30) Foreign Application Priority Data

Dec. 4, 2023  (DE) .......................... 102023212113.1

(51) Int. Cl.
*F16H 57/08* (2006.01)

(52) U.S. Cl.
CPC .................................. *F16H 57/08* (2013.01)

(58) Field of Classification Search
CPC .............................. F16H 57/08; F16H 57/0482
See application file for complete search history.

(56) References Cited

U.S. PATENT DOCUMENTS

| 2,491,306 | A | * | 12/1949 | Feitl | F16B 21/186 |
| | | | | | 411/518 |
| 8,769,819 | B2 | * | 7/2014 | Paelicke | F16H 57/08 |
| | | | | | 475/903 |
| 9,709,133 | B2 | * | 7/2017 | Otsuki | F16H 57/0426 |
| 12,083,879 | B2 | * | 9/2024 | Reisch | F16H 48/10 |
| 2017/0314649 | A1 | * | 11/2017 | Michikoshi | F16H 57/0006 |

FOREIGN PATENT DOCUMENTS

| DE | 869280 C | 3/1953 |
| DE | 102012218357 A1 | 4/2013 |
| DE | 102019216507 A1 | 4/2021 |

OTHER PUBLICATIONS

German Search Report for Application No. 102023212113.1 Dated Oct. 2, 2024.

* cited by examiner

*Primary Examiner* — Derek D Knight
(74) *Attorney, Agent, or Firm* — Dority & Manning, P.A.

(57) ABSTRACT

A coupling element (30) includes an internal toothing and a cutout (32). The coupling element (30) is configured for coupling a first gear set and a second gear set of a gearing. The first gear set includes at least one first ring gear (15). The coupling element (30) forms the first ring gear (15) on an inner circumference via the internal toothing. The coupling element (30) is formed in an annular manner. At least one cutout (32) is formed on at least one first end region in an axial direction.

16 Claims, 6 Drawing Sheets

COUPLING ELEMENT AND GEARING WITH COUPLING ELEMENT

CROSS-REFERENCE TO RELATED APPLICATION

The present application is related and has right of priority to German Patent Application No. DE102023212113.1 filed on Dec. 4, 2023, which is incorporated by reference in its entirety for all purposes.

TECHNICAL FIELD

The present invention relates generally to a coupling element and to a gearing with a coupling element.

BACKGROUND

A coupling element for mechanically coupling a first planetary gear set to a second planetary gear set is known. The coupling element includes a ring gear at an inner circumference, which is in engagement with a planetary gear located on the inside in a radial direction.

SUMMARY

Example aspects of the present invention provide an improved coupling element with which the efficiency and the lubricating function of the gearing is increased during operation.

A coupling element includes an internal toothing and a cutout. The coupling element is configured for coupling a first gear set and a second gear set of a gearing. The first gear set and the second gear set may be arranged offset with respect to each other in an axial direction. The first gear set includes at least one first ring gear. The second gear set may include at least a second spur gear. The coupling element forms the first ring gear on an inner circumference via the internal toothing. The coupling element is formed in an annular manner. The internal toothing may extend in the axial direction through the entire coupling element. At least one cutout is formed at at least one first end region in the axial direction. The first end region may be arranged at the internal toothing. At least one cutout may be provided at a second end region opposite the first end region in the axial direction. The second end region may be arranged at the internal toothing.

If two elements are coupled to each other, a movement of one element causes a reaction of the other element. For example, a connection may be provided by a form-locking or frictional connection. Further elements may be provided between the elements. For example, a connection may be torque-proof. A torque-proof connection of two elements is understood to mean a connection in which the two elements are rigidly coupled to each other for all intended states, for example of a gearing, so that the two elements have substantially the same rotational speed. The elements may be provided here as individual components torque-proofly connected to each other or else as one piece.

The first gear set may include a first spur gear. The first spur gear may be engaged with the first ring gear. If the first gear set is arranged offset with respect to the second gear set in the axial direction, the second spur gear of the second gear set may abut against the first spur gear of the first gear set in the axial direction. The second spur gear and the coupling element may thus be positioned relatively to each other in the axial direction. The second spur gear may be arranged within the first ring gear in the radial direction. The second spur gear may overlap the first ring gear in the radial direction. The coupling element may include a connecting device, for example a claw connection or a securing element or a combination thereof, for the torque-proof connection to the second spur gear. The first gear set and the second gear set may thus be coupled via the coupling element.

A contact point of the first spur gear and of the second spur gear may be formed via an end face of the first spur gear and an end face of the second spur gear, wherein the two end faces touch each other. One of the two end faces may be spherical, such that a line touch or a line contact results between the first spur gear and the second spur gear.

The cutout may be arranged at the delimiting surface of the oil chamber outside the region of the line touch in the radial direction.

In one example embodiment, the coupling element may include an external toothing at an outer circumference.

In one example embodiment, the second gear set may include at least the second spur gear. The coupling element may form the second spur gear at the inner circumference via the external toothing. In this respect, the internal toothing may be torque-proofly connected to the external toothing. The external toothing may extend in the axial direction through the entire coupling element. The coupling element may then form a sun ring gear. The first gear set and the second gear set may thus be coupled via the coupling element. The first gear set and the second gear set may be arranged in the same plane in the axial direction. The second gear set may be arranged outside the first gear set in the radial direction.

At least one of the external toothing and the internal toothing of the coupling element may be helically toothed. Both the external toothing and the internal toothing may be helically toothed. The internal toothing and the external toothing may be helically toothed in the same direction.

In one example embodiment, the coupling element may include a circumferential groove which is formed at the inner circumference of the coupling element. The groove may be arranged at the first end region of the coupling element.

The cutout may overlap a groove base of the groove in the radial direction. The groove base may be the cylindrical surface of the groove located at the outside in the radial direction. Two grooves may be present. Each groove may be respectively arranged in one of the two end regions of the coupling element, which are opposite each other in the axial direction. A groove may form a wall section extending in the radial direction. The wall section may be arranged at an outer side of the groove in the axial direction.

In one example embodiment, the cutout may extend from the groove in the axial direction through the coupling element to an outer side of the coupling element. The cutout may extend through the wall section of the coupling element extending in the radial direction. The cutout may extend obliquely, that is to say in the radial direction and in the axial direction, through the coupling element to the outer side of the coupling element. The cutout may extend obliquely inwardly in the radial direction. The cutout may extend obliquely outwardly in the radial direction.

In one example embodiment, an oil chamber may be formed at the inner circumference of the coupling element. The oil chamber may be delimited in the axial direction by a delimiting surface. The delimiting surface may extend in a circumferential direction. A delimiting surface may be arranged in the axial direction at the end region of the internal toothing. The oil chamber may include the toothing of the first ring gear.

The groove may at least partially form the delimiting surface. For example, a surface of the groove located at the outside in the axial direction and extending in the radial direction may form the delimiting surface. The surface extending in the radial direction may be an internal surface of the wall section extending in the radial direction. The oil chamber may extend between two grooves. The oil chamber may be formed between the groove base and the surfaces of the groove extending in the circumferential direction. A centrifugal force, which conveys oil for lubricating the first ring gear in the radial direction to the inner circumference of the coupling element, may act in the radial direction.

The oil chamber may be delimited by a second delimiting surface. The second delimiting surface may be provided at a second end region opposite the first end region. The second delimiting surface may at least partially be formed by a further groove which is arranged at the second end region. The oil chamber may extend inwardly in the axial direction to the center of the coupling element. The oil chamber may be arranged in the axial direction between two delimiting surfaces. The oil chamber may be respectively delimited by the groove base of the grooves, the surface of the grooves located at the outside in the axial direction and the inner circumference of the coupling element.

In one example embodiment, the oil chamber may be in fluid communication with at least one cutout. The cutout may be formed such that the cutout enables an oil flow out of the oil chamber in the axial direction of the coupling element. The oil flow may take place in the radial direction and in the axial direction out of the oil chamber.

If two elements are in fluid communication with each other, a fluid, for example oil, may be conducted from one element to the other element. In this case, the fluid connection may be formed in a leakage-free manner, so that the oil is conducted substantially completely from one element to the other element.

One of the cutouts may be formed such that the cutout includes a fluid connection with the boundary surface of the oil chamber located furthest on the outside in the axial direction. The cutout may be in fluid communication with the groove base. This improves a discharge of oil from the oil chamber via centrifugal force.

In one example embodiment, the cutout may be formed via a through bore. The bore may lead to the groove base. The bore may lead to delimiting surface of the oil chamber extending in the radial direction. The bore may extend obliquely, that is to say in the radial direction and in the axial direction, through the coupling element to the outer side of the coupling element. The cutout may be formed by a bore which is angled with respect to the axial direction.

The cutout may have a rectangular cross section in the circumferential direction. The cutout may be produced via a face milling cutter which is moved in the radial direction and which is aligned in the axial direction.

In one example embodiment, a plurality of cutouts may be provided. The cutouts may be uniformly distributed in the circumferential direction. A number of cutouts may be provided on each of the first end region and the second end region of the coupling element. The number of cutouts may be even. More than three, for example eight, cutouts may be provided on each of the first end region and the second end region of the coupling element. If cutouts are provided on each of the first end region and the second end region of the coupling element, then the same number of cutouts may be provided in each of the end regions and the cutouts of the two end regions may be provided at the same position in the circumferential direction.

In one example embodiment, the coupling element may include a securing element which is configured at least indirectly for the relative positioning of the coupling element and at least the first spur gear of the first gear set in the axial direction. The first spur gear may be in engagement with the first ring gear. A surface of the securing element located on the inside in the axial direction may at least partially form the delimiting surface of the oil chamber. The securing element may be formed by a snap ring or securing ring. The circumferential groove may be configured for the positioning of the securing element in the axial direction. The securing element may be fitted into the circumferential groove of the coupling element. The cutout in the radial direction may be arranged such that the cutout includes a region outside the securing ring in the radial direction. The cutout may be formed by omitting at least one tooth. The cutout may be formed by omitting a tooth of the first ring gear in the wall section extending in the radial direction.

In one example embodiment, the cutout may extend through the securing element. The cutout may be formed by weakening the securing element on the outer circumference of the securing element. The cutout may extend outside the weakened securing element and through the wall section of the coupling element extending in the radial direction. The cutout may extend through the securing element and the wall section extending in the radial direction. The cutout may be formed by a combination of an angled bore and a bore extending in the axial direction.

In one example embodiment, a thrust washer may be provided between the coupling element and the first planetary gear for the relative positioning of the coupling element and the first spur gear. The thrust washer may be configured for abutment against the internal surface of the securing element. The thrust washer may be configured for the axial positioning of the first spur gear. The thrust washer may be arranged between the securing element and the first spur gear. A surface of the thrust washer located at the inside in the axial direction may at least partially form the delimiting surface of the oil chamber. The internal surface of the thrust washer may be of a spherical configuration inward in the axial direction. When the thrust washer makes contact with the first planetary gear, a line touch or a line contact may be formed.

The cutout may extend in the axial direction from the outer side of the coupling element beyond the surface of the thrust washer located at the inside in the axial direction. The thrust washer and the securing ring may be formed as a one-piece element.

In one example embodiment, the cutout may extend through the thrust washer. The cutout may be formed by weakening the thrust washer at its outer circumference. The cutout may extend outside the weakened thrust washer and through the wall section of the coupling element extending in the radial direction. The cutout may extend outside the weakened thrust washer, outside the weakened securing element and through the wall section of the coupling element extending in the radial direction. The cutout may extend through the wall section extending in the radial direction, the securing element or the thrust washer, or a combination thereof.

In one example aspect, a gearing includes a first gear set, a second gear set, and a coupling element according to one of the preceding example embodiments. The first gear set includes the first ring gear. The second gear set includes the second spur gear.

In one example embodiment, the first gear set may be formed by a first planetary gear set which may comprise a first sun gear, a first planet carrier, a first planetary gear and the first ring gear. The first planetary gear may form the first spur gear. The first sun gear may be in engagement with the first planetary gear. The first planetary gear may be in engagement with the first ring gear.

In one example embodiment, the second gear set may be formed by a second planetary gear set. The second planetary gear set may comprise a second sun gear, a second planet carrier, a second planetary gear and a second ring gear. The second sun gear may form the second spur gear. The second sun gear may be in engagement with the second planetary gear. The second planetary gear may be in engagement with the second ring gear. The first planetary gear set and the second planetary gear set may be arranged in the same plane in the axial direction. The first planetary gear set and the second planetary gear set may be arranged offset with respect to each other in the axial direction.

The gearing may have the function of a differential gearing.

DETAILED DESCRIPTION

Figure 1:
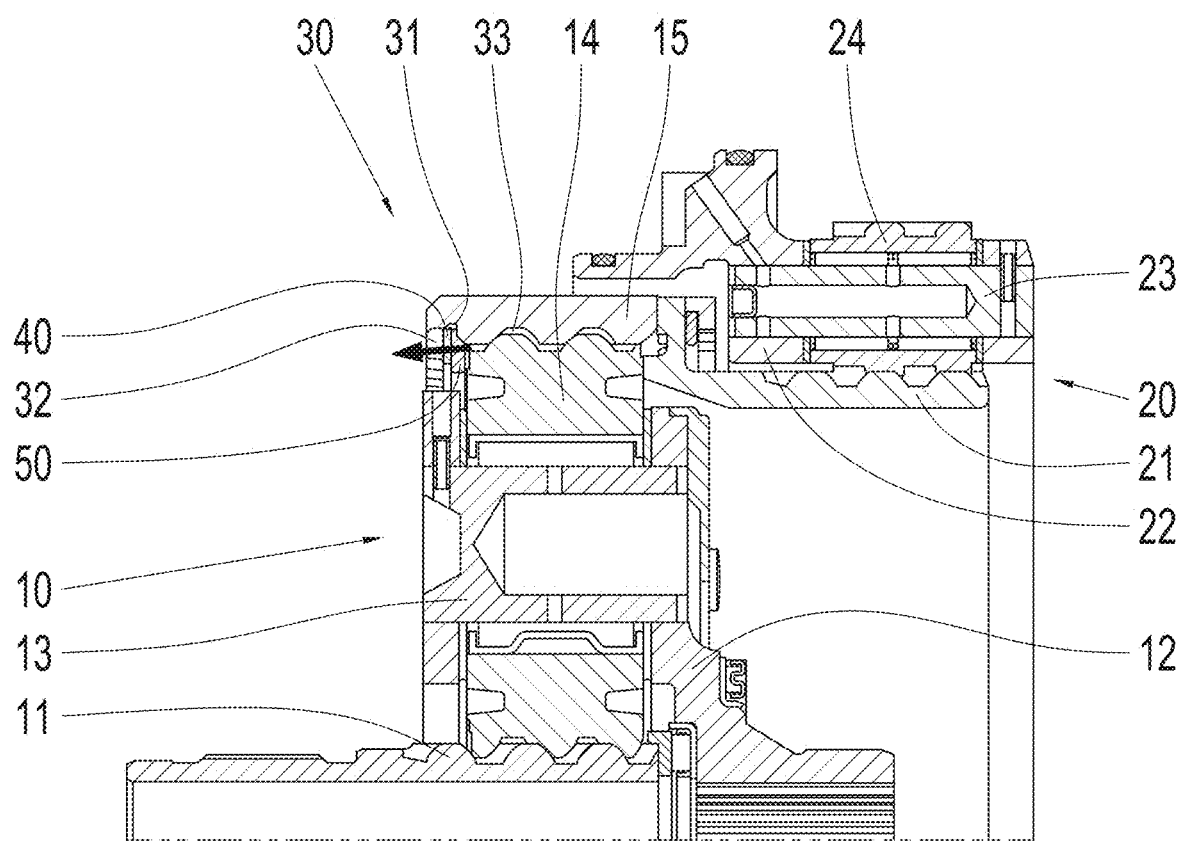
FIG. 1 shows a sectional view of an example embodiment of a gearing with a coupling element.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of an example embodiment of a gearing with a coupling element. The gearing includes a first gear set, in the present case a first planetary gear set 10, and a second gear set, in the present case a second planetary gear set 20, and a coupling element 30. The coupling element 30 is formed in an annular manner. The coupling element 30 includes an internal toothing at an inner circumference and thus forms a first ring gear 15 of the first gear set 10. The coupling element 30 includes a cutout 32 at a first end region in an axial direction.

The first ring gear 15 is lubricated and cooled via oil. The oil is conveyed by centrifugal force or in another manner in a radial direction to the inner circumference of the coupling element 30. As a result, an oil chamber 33 is formed on the inner circumference of the coupling element 30. The cutout 32 extends in an axial direction through the coupling element 30 from the oil chamber 33 to an outer side of the coupling element 30. As a result, the oil can flow out of the oil chamber 33 to the outer side of the coupling element 30.

Further details of the gearing and of the coupling element 30 are described below.

The first planetary gear set 10 includes a first sun gear 11, a first planet carrier 12, a number of first planet bolts 13, a number of first planetary gears 14, and a first ring gear 15. The first sun gear 11 is engaged with one of the first planetary gears 14. One of the first planetary gears 14 is in engagement with the first ring gear 15 and is rotatably mounted on one of the first planet bolts 13. The first planet bolts 13 are connected to the first planet carrier 12.

The second planetary gear set 20 includes a second sun gear 21, a second planet carrier 22, a number of second planet bolts 23, a number of second planetary gears 24, and a second ring gear 25. The second sun gear 21 is in engagement with one of the second planetary gears 24. One of the second planetary gears 24 is in engagement with the second ring gear and is rotatably mounted on one of the second planet bolts 23. The second planet bolts 23 are connected to the second planet carrier 22. The second planet carrier 22 is formed by a stationary component 9. The first planetary gear set 10 is arranged offset with respect to the second planetary gear set 20 in the axial direction.

The second sun gear 21 is arranged within the first ring gear 15 and coupling element 30 in a radial direction, respectively, and extends partially or in sections in the axial direction within the coupling element 30. The second sun gear 21 is torque-proofly connected to the coupling element 30. The second sun gear 21 bears against at least one of the first planetary gears 14 in the axial direction. As a result, one of the first planetary gears 14 is positioned in the axial direction with respect to the second sun gear 21 and with respect to the first ring gear 15 and coupling element 30, respectively. The contact surfaces of the first planetary gear 14 and the second sun gear 21 are configured such that the contact surfaces form a line contact. The cutout 32 is arranged outside the region of the line contact in a radial direction.

In the axial direction on the left-hand side, a circumferential groove 31 is formed on a first end region at the inner circumference of the coupling element 30. A securing element 40 is fitted into the circumferential groove 31. A thrust washer 50 is arranged between one of the first planetary gears 14 and the securing element 40. The thrust washer 50 serves for the relative positioning of one of the first planetary gears 14 with respect to the coupling element 30. A delimiting surface of the oil chamber 33 is partially formed on the left-hand side by a surface of the groove 31 located on the outside in the axial direction and extending in the radial direction. Furthermore, the delimiting surface is partially formed by a surface of the securing element 40 located on the inside in the axial direction. Furthermore, the delimiting surface is formed by a surface of the thrust washer 50 located on the inside in the axial direction. At a second end region of the coupling element 30, a second delimiting surface is formed by a section of the second sun gear 21 extending in the radial direction, which overlaps the delimiting surface at the first end region of the coupling element 30 in the radial direction.

The groove 31 forms a wall section at the first end region, which extends inwardly in the radial direction from a groove base. The cutout 32 extends from the groove 31 in the axial direction through the wall section of the coupling element 30 to an outer side of the coupling element 30. The cutout 32 is formed via a bore in the axial direction. The cutout 32 overlaps an outer circumference of the securing element 40 in the radial direction. A plurality of cutouts 32 are uniformly distributed in a circumferential direction. The oil flow direction from the oil chamber 33 to the outer side of the coupling element 30 through one of the cutouts 32 is illustrated in FIG. 1 by a thick arrow.

Figure 2:
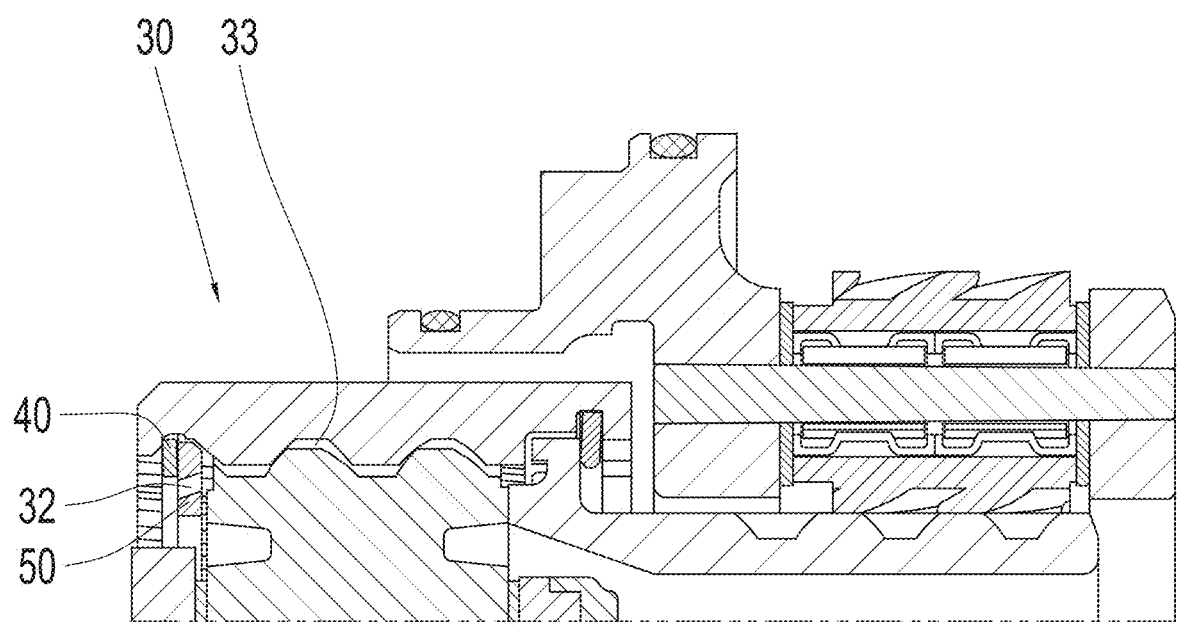
FIG. 2 shows a sectional view of a further example embodiment of the gearing with the coupling element.

FIG. 2 shows a sectional view of a further example embodiment of the gearing with the coupling element 30. The present example embodiment includes all the features of the preceding example embodiment. The present example embodiment differs from the preceding example embodiment in the configuration of the cutout 32.

In the present example embodiment, the cutout 32 is formed in the thrust washer 50. The wall section extending in the radial direction has no cutout 32. The cutout 32 is formed by a bore which is angled with respect to the axial direction and is inclined inwardly in the radial direction. The cutout 32 ends in the radial direction within the securing element 40. The oil can flow out of the oil chamber 33 to the outer side of the coupling element 30 via the cutout 32 through the thrust washer 50.

Figure 3:
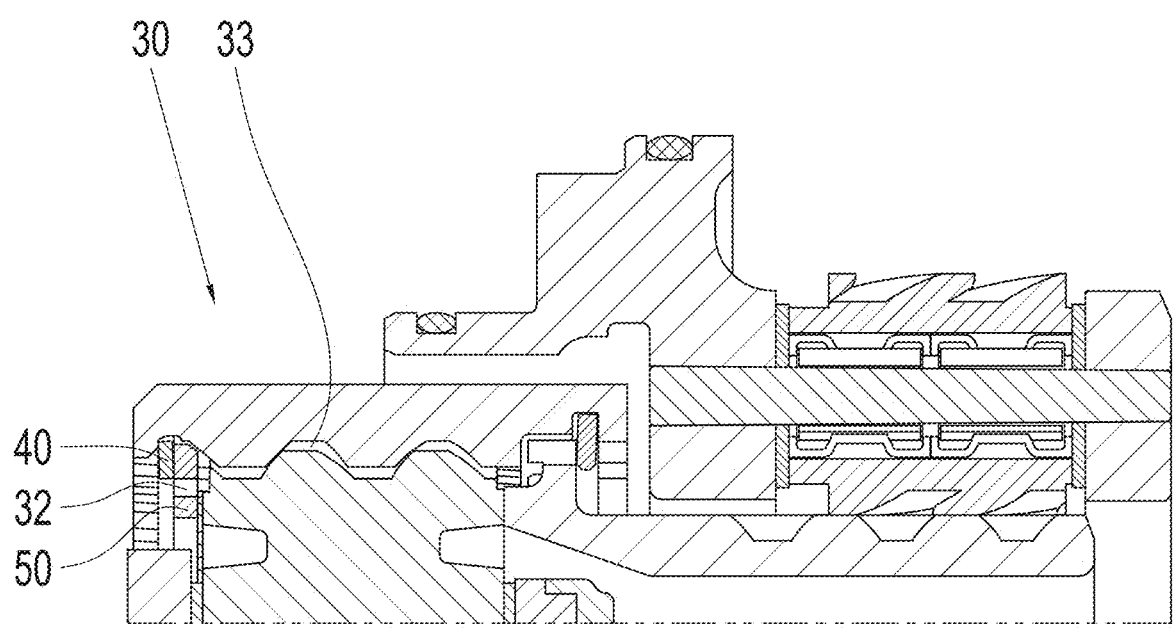
FIG. 3 shows a sectional view of a further example embodiment of the gearing with the coupling element.

FIG. 3 shows a sectional view of a further example embodiment of the gearing with the coupling element 30. The present example embodiment includes all the features of the example embodiment described with reference to FIG. 2. The present example embodiment differs from the example embodiment described with reference to FIG. 2 in the configuration of the cutout 32.

In the present example embodiment, the cutout 32 extends in the axial direction. The cutout 32 is not inclined inwardly in the radial direction. The cutout 32 ends in the radial direction within the securing element 40. The oil can flow out of the oil chamber 33 to the outer side of the coupling element 30 via the cutout 32 through the thrust washer 50.

Figure 4:
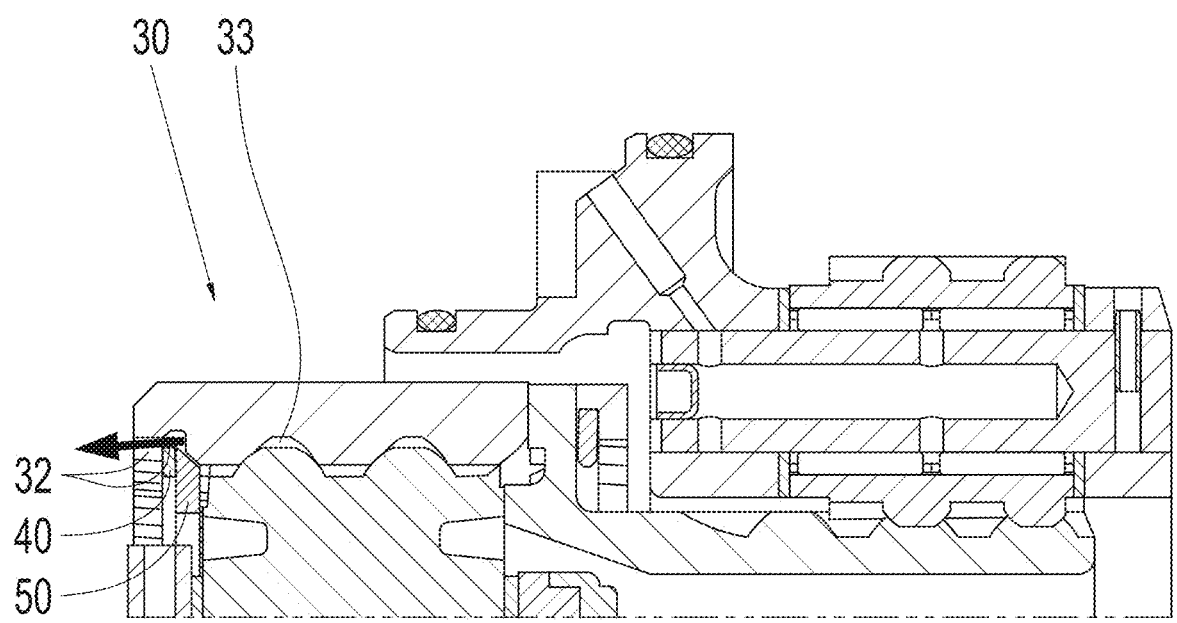
FIG. 4 shows a sectional view of a further example embodiment of the gearing with the coupling element.

FIG. 4 shows a sectional view of a further example embodiment of the gearing with the coupling element 30. The present example embodiment includes all the features of the example embodiment described with reference to FIG. 1. The present example embodiment differs from the example embodiment described with reference to FIG. 1 in the configuration of the cutout 32.

In the present case, the cutout 32 is formed by weakening an outer circumference of the securing element 40. In addition to the bore extending in the axial direction in the wall section of the coupling element 30, which extends in the radial direction, the cutout 32 is formed by a weakened region at the outer circumference of the securing element 40. In the weakened region, an outer side of the securing element 40 is at a distance from the groove base in the radial direction. As a result, the oil can flow out of the oil chamber 33 past the securing element 40 through the bore in the wall section of the coupling element 30 extending in the radial direction to the outer side. The oil flow direction from the oil chamber 33 to the outer side of the coupling element 30 through one of the cutouts 32 is illustrated in FIG. 4 by a thick arrow.

Figure 5:
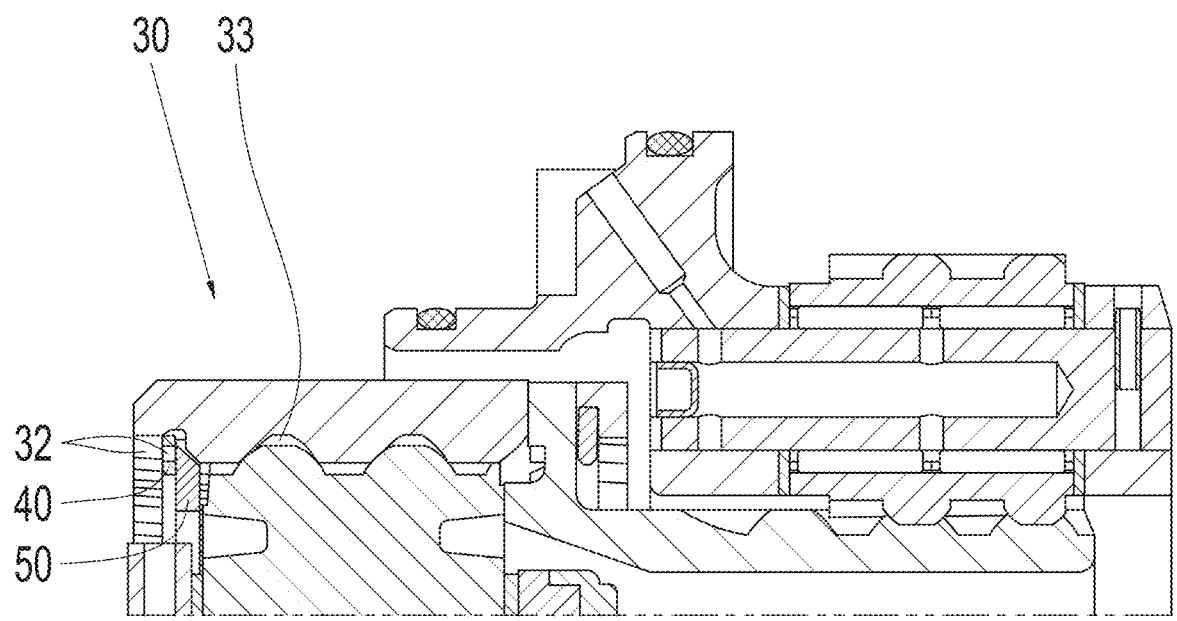
FIG. 5 shows a sectional view of a further example embodiment of the gearing with the coupling element.

FIG. 5 shows a sectional view of a further example embodiment of the gearing with the coupling element 30. The present example embodiment includes all the features of the example embodiment described with reference to FIG. 4. The present example embodiment differs from the example embodiment described with reference to FIG. 1 in the configuration of the cutout 32.

In the present example embodiment, the securing ring extends in the radial direction as far as the groove base. The cutout 32 is additionally formed via a bore in the securing element 40. The bore in the securing element 40 extends in the axial direction. The oil can flow out of the oil chamber 33 to the outer side of the coupling element 30 via the cutout 32.

Figure 6:
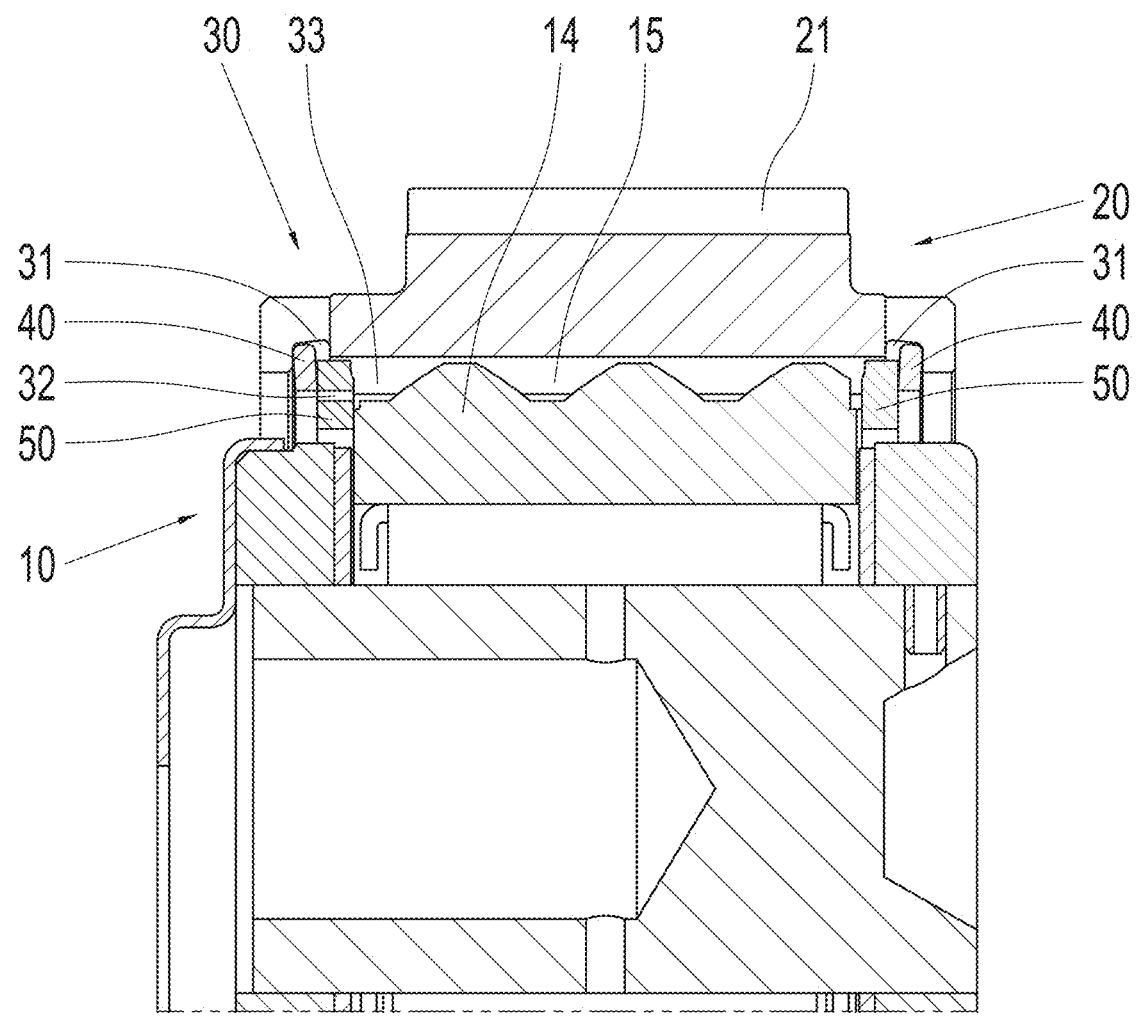
FIG. 6 shows a sectional view of a further example embodiment of the gearing with the coupling element.

FIG. 6 shows a sectional view of a further example embodiment of the gearing with the coupling element 30. The present example embodiment includes all the features of the example embodiment described with reference to FIG. 3. The present example embodiment differs from the example embodiment described with reference to FIG. 3 in the arrangement of the second planetary gear set 20 and the configuration of the coupling element 30.

In the present example embodiment, the first planetary gear set 10 and the second planetary gear set 20 are arranged in the same plane in the axial direction. The first planetary gear set 10 is arranged within the second planetary gear set 20 in the radial direction. The first planetary gear set 10 and the second planetary gear set 20 are arranged in a stacked manner.

In particular, no contact surface is present between one of the first planetary gears 14 and the second sun gear 21. The second sun gear 21 is formed at an outer circumference of the coupling element 30. The first ring gear 15 is formed at the inner circumference of the coupling element 30.

The coupling element 30 includes a circumferential groove 31 at the second end region. Furthermore, the coupling element 30 includes a further securing element 40 and a further thrust washer 50 at the second end region. The oil chamber 33 thus includes a second delimiting surface on the right-hand side in FIG. 6, which is partially formed by the groove 31, the securing element 40 and the thrust washer 50.

In a further example embodiment, the coupling element 30 includes cutouts 32 at the second end region, which are arranged at the same positions in the radial direction as the cutouts 32 at the first end region.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 9 stationary component
10 first planetary gear set
11 first sun gear of the first planetary gear set
12 first planet carrier of the first planetary gear set
13 first planet bolt of the first planetary gear set
14 first planetary gear of the first planetary gear set
15 first ring gear of the first planetary gear set
20 second planetary gear set
21 second sun gear of the second planetary gear set
22 second planet carrier of the second planetary gear set
23 second planet bolt of the second planetary gear set
24 second planetary gear of the second planetary gear set
30 coupling element
31 groove
32 cutout 33 oil chamber
40 securing element
50 thrust washer

The invention claimed is:

1. A coupling element (30), comprising:
an internal toothing; and
a cutout (32),
wherein the coupling element (30) is configured for coupling a first gear set and a second gear set of a gearing, the first gear set comprising a first ring gear (15), the coupling element (30) forms the first ring gear (15) on an inner circumference of the coupling element (30) via the internal toothing,
wherein the coupling element (30) is formed in an annular manner, and the cutout (32) is formed at a first end region of the coupling element (30) in an axial direction, and
wherein an oil chamber (33) is formed by the coupling element (30), the cutout (32) enabling an oil flow out of the oil chamber (33) in the axial direction.

2. The coupling element (30) of claim 1, further comprising an external toothing on an outer circumference of the coupling element (30).

3. The coupling element (30) of claim 2, wherein:
the second gear set comprises a second spur gear; and
the coupling element (30) forms the second spur gear on the outer circumference via the external toothing.

4. The coupling element (30) of claim 1, wherein a circumferential groove (31) is formed at the first end region and at the inner circumference of the coupling element (30).

5. The coupling element (30) of claim 4, wherein the cutout (32) extends from the circumferential groove (31) in the axial direction through the coupling element (30) to an outer side of the coupling element (30).

6. The coupling element (30) of claim 4, wherein:
the oil chamber (33) is formed at the inner circumference of the coupling element (30);
the oil chamber (33) is delimited in the axial direction by a delimiting surface; and
the circumferential groove (31) at least partially forms the delimiting surface.

7. The coupling element (30) of claim 6, wherein:
the oil chamber (33) is in fluid communication with the cutout (32); and
the cutout (32) is configured for receipt of the oil flow out of the oil chamber (33) in the axial direction.

8. The coupling element (30) of claim 1, wherein the cutout (32) is formed via a through hole.

9. The coupling element (30) of claim 1, wherein the cutout (32) is one of a plurality of cutouts (32).

10. The coupling element (30) of claim 1, wherein:
the coupling element (30) further comprises a securing element (40);
the securing element (40) is configured at least indirectly for relative positioning of the coupling element (30) and a first spur gear of the first gear set in the axial direction;
the first spur gear is configured for engagement with the first ring gear (15); and
a surface of the securing element (40) least partially forms a delimiting surface of the oil chamber (33) along the axial direction.

11. The coupling element (30) of claim 10, wherein the cutout (32) extends through the securing element (40).

12. The coupling element (30) of claim 10, wherein:
the coupling element (30) further comprises a thrust washer (50);
the thrust washer (50) is configured for relative positioning of the coupling element (30) and the first spur gear between the coupling element (30) and the first spur gear; and
a surface of the thrust washer (50) at least partially forms the delimiting surface of the oil chamber (33) in the axial direction.

13. The coupling element (30) of claim 12, wherein the cutout (32) extends through the thrust washer (50).

14. A gearing, comprising:
the first gear set;
the second gear set; and
the coupling element (30) of claim 1,
wherein the first gear set comprises the first ring gear (15), and the second gear set comprises a second spur gear.

15. The gearing of claim 14, wherein:
the first gear set is formed by a first planetary gear set (10) that comprises a first sun gear (11), a first planet carrier (12), a first planetary gear (14), and the first ring gear (15); and
the first planetary gear (14) forms a first spur gear, the first sun gear (11) is in engagement with the first planetary gear (14), and the first planetary gear (14) is in engagement with the first ring gear (15).

16. The gearing of claim 14, wherein:
the second gear set is formed by a second planetary gear set (20) that comprises a second sun gear (21), a second planet carrier (22), a second planetary gear (24), and a second ring gear; and
the second sun gear (21) forms the second spur gear, the second sun gear (21) is in engagement with the second planetary gear (24), and the second planetary gear (24) is in engagement with the second ring gear.

* * * * *